Patented Apr. 29, 1924.

1,492,367

UNITED STATES PATENT OFFICE.

AXEL FRANCK-PHILIPSON, OF CHICAGO, ILLINOIS.

SOLUBLE SOLIDIFIED COAL-TAR DERIVATIVE DISINFECTANT.

No Drawing.   Application filed January 10, 1923. Serial No. 611,846.

*To all whom it may concern:*

Be it known that I, AXEL FRANCK-PHILIPSON, a citizen of the United States, residing at Chicago, in the county of Cook and State of Illinois, have invented certain new and useful Improvements in Soluble Solidified Coal-Tar Derivative Disinfectant, of which the following is a specification.

This invention has for its object to provide a disinfectant adapted for sheep and cattle dipping and other purposes, which is in readily soluble, solid form, adapted to form a perfect and permanent emulsion in water, and which is of such concentrated strength that a very small amount thereof will produce a relatively larger volume of emulsified liquid of a given coefficiency than can be obtained from a similar weight or volume of disinfectant of the same class, produced in liquid form. The invention also consists in the process for producing said disinfectant.

The general class to which the disinfectant of my invention relates is that of the phenols, or coal-tar derivatives, which are most commonly used for sheep and cattle dipping purposes.

Many attempts were made, prior to my present invention, to produce such a disinfectant in solid, as distinguished from liquid form, in order to render the same more readily portable for use on ranges and to overcome the big expense and inconveniences attached to shipments of liquid, but, so far as I am informed, no such solidified product, having the several requisites of easy solubility and emulsifiability, was produced prior to my invention, except in so far as such a product and process are disclosed in Letters Patent granted me, Nos. 1,282,062 and 1,392,564, respectively.

The present invention distinguishes from the disclosures of the aforesaid patents in several important particulars, as will appear from the following specification, it being the particular object of the present invention to provide a product which will form a more perfect and permanent emulsion than that of the aforesaid patents, and to provide any desired coefficiency without resort to other products than those of the general class of phenols.

To produce the improved product, a quantity of coal-tar distillate, preferably the second or third, commonly known as "tar-oil," is mixed with an alkaline solution, preferably caustic soda of specific gravity of about 40 degrees Baumé, in the proportion of about seven parts of the tar-oil to about three parts of the caustic soda solution. This mixture is boiled for about an hour, being stirred continuously during this period. This effects saponification of the tar-oil and neutralization of the free acids thereof. The proportion of the said acids may be and preferably is, increased by adding to the tar-oil as much cresol as may be necessary to produce a finished product of a given coefficiency, the amount of cresol added depending upon the grade used and the coefficiency desired in the finished product. The addition of cresol requires the use of more of the caustic soda solution.

After saponification of the tar-oil, (and the added cresol, if any) whereby a liquid mineral soap is produced, there is added to it a quantity of an animal or vegetable oil, preferably a hard-oil, such as stearic acid or cocoanut oil. The latter is melted and mixed with an alkaline solution, preferably the caustic soda solution above described, in approximately the proportion above specified, and this mixture is then added to the hot liquid above referred to in the proportion of about two to three parts of the latter to one of the last mentioned mixture, and the whole mixture is then boiled for a period of about fifteen minutes, whereby saponification of the animal or vegetable oil is effected and a hard soap produced which is ultimately intimately commingled with the liquid mineral soap first produced. As the boiling continues, samples are taken at intervals and allowed to cool and congeal, and when such congelation is of the desired degree, the boiling is discontinued.

There is then added to the still hot liquid mass, either a sulphureted fat, such as sulphureted cotton-seed or soya-bean oil, or a plain fat, preferably cocoanut oil, and a sulphur-salt or sulphurous compound. Glauber-salt is satisfactory for the purpose and is added in the proportion, approximately, of 5 parts by water to 100 parts of fat. The purpose of adding fat and sulphur salt, or sulphurous compound, is to aid emulsification.

After adding the sulphureted oil, or fat or the fat and sulphurous substance together with sufficient of the aforesaid caustic soda solution to saponify said added fat, boiling of the mass is continued for about fifteen to twenty minutes.

The proportion of plain and sulphureted oils used may be varied, though preferably about equal proportions are used, the result of using the sulphureted oils being to produce a harder or more solid vegetable or animal soap and to materially aid emulsion.

The finished product may be described as consisting of a hard animal or vegetable soap of a very cellular type, the cells of which are filled with liquid mineral soap, the hard soap being the carrier or container for the latter. A lump of the product dropped into water will dissolve quite rapidly, without stirring or agitation, the water apparently destroying or breaking up the carrier and thus releasing the liquid soap.

An exemplary batch of the product having a coefficiency ranging from about 4 to 5, would consist, by weight, of one hundred parts of the tar-oil, one hundred parts of cresol of a coefficiency approximating twelve, about 33 parts cocoanut oil or stearic acid, about the same proportion of sulphureted oil, and substantially 33 parts of caustic soda solution, all admixed and treated substantially as hereinbefore described.

If no cresol is added, the resultant product would have a coefficiency of about one to two.

The product resulting from the aforesaid exemplary batch treatment is of such strength that one pound thereof, emulsified with thirty gallons of water, will produce a very efficient sheep-dip, etc.

The foregoing proportions of ingredients are very variable and flexible, and the manner of and order of treatment is also variable, as will be quite obvious to persons skilled in the art. For example, the cocoanut oil or the like, may be separately saponified and then admixed with the hot mineral soap, and this is true also of the sulphureted oil. Substitution of other ingredients adapted to the purpose, for those specifically set forth, lies within the skill of the chemist, and all such variations and substitutions as may be made by persons skilled in the art, are included in the invention as defined in the appended claims.

I claim as my invention:

1. A disinfectant having the characteristics substantially as hereinbefore set forth, consisting of a saponified fat, including sulphureted fat, and a neutralized coal-tar distillate of substantially the character set forth.

2. A disinfectant having the characteristics hereinbefore set forth, comprising a saponified fat, a coal-tar distillate substantially as set forth, having a phenol acid added thereto, said added acid and the free acids of said distillate having been neutralized.

3. A disinfectant having the characteristics as hereinbefore set forth, consisting of a coal-tar distillate of the character specified, and admixed with cresol, the free acids of the mixture neutralized, and a saponified fat including sulphureted fat.

4. A disinfectant having the characteristics hereinbefore set forth, consisting of a coal-tar distillate, substantially as mentioned, the free acids of the mixture neutralized, and a compound consisting of saponified fats, including sulphureted fat, said compound adapted to form a solid soap.

5. A soluble solid disinfectant of the character hereinbefore specified, consisting of a liquid mineral soap, incorporated in a solid vegetable or animal soap, the latter including a saponified sulphureted fat.

6. A product of the kind specified consisting of a saponified fat, a neutralized coal-tar distillate, and a sulphurous ingredient capable of aiding emulsification of the compound.

AXEL FRANCK-PHILIPSON.